Sept. 12, 1961 J. F. LAYCAK 2,999,944
NON-CONTACTING WIDTH GAGE
Filed Dec. 29, 1959
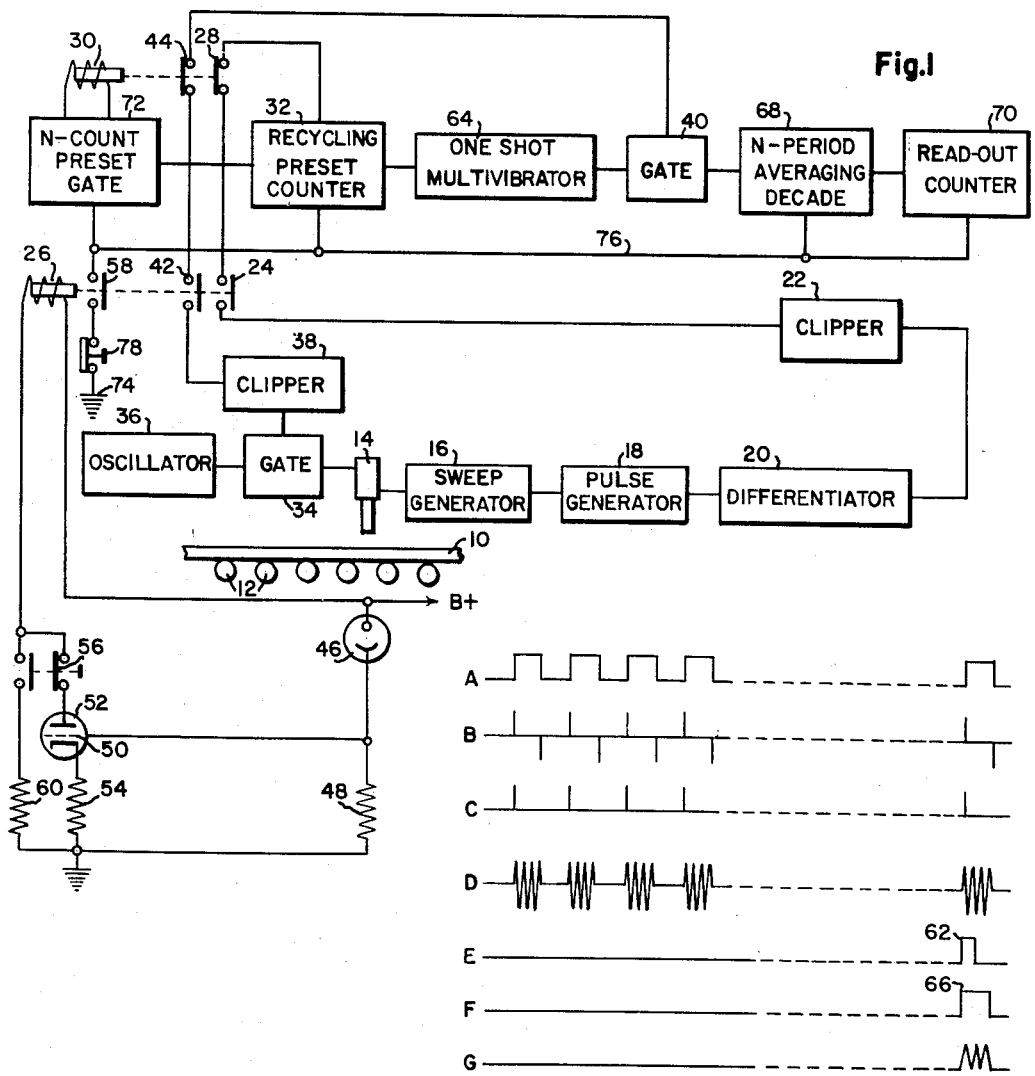
Fig.1
Fig.2
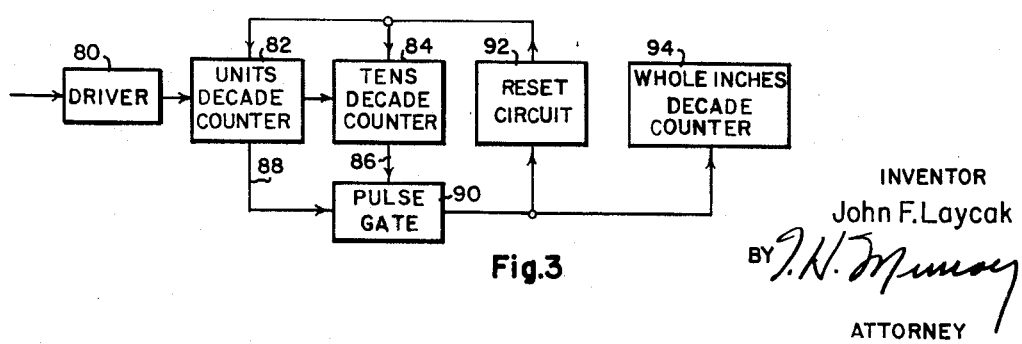
Fig.3
INVENTOR
John F. Laycak
BY
ATTORNEY

United States Patent Office 2,999,944
Patented Sept. 12, 1961

2,999,944
NON-CONTACTING WIDTH GAGE
John F. Laycak, Duquesne, Pa., assignor to Jones & Laughlin Steel Corporation, Pittsburgh, Pa., a corporation of Pennsylvania
Filed Dec. 29, 1959, Ser. No. 862,676
11 Claims. (Cl. 250—219)

This invention relates to non-contacting devices for electronically measuring the width or other dimension of an article. More particularly, the invention relates to non-contacting width measuring apparatus which averages a plurality of width measurements taken along the length of a body.

Various systems have been proposed wherein the width or other dimension of an irradiant or illuminated body is measured by the use of an electron-optics device. In such a system circuitry including a photosensitive device such as a vidicon is used to produce a group of pulses or oscillations each time its electron beam scans over the dimension to be measured. In this manner the number of pulses in each group will be proportional to the dimension being scanned; and thus, by counting the pulses in any one group, a dimensional reading may be obtained. Since the electron beam scans along a very narrow line, the dimension is measured at this one location only for each scan cycle. The dimension being measured, however, may vary along the other dimension of the article so that, if width is being measured, for example, it is altogether desirable to average several readings at various points along the length of the article to obtain a representative width measurement. This may be accomplished by moving the object being measured relative to the electron-optics device or vice versa; however, it is also necessary to provide circuitry for averaging the readings taken along the length of the object.

Accordingly, it is a primary object of this invention to provide circuit apparatus for averaging dimensional readings in the form of groups of voltage pulses such as those which are obtained from an electron-optics device which scans an image of the object being measured.

More generally, an object of the invention resides in the provision of a new and improved non-contacting width gage.

In accordance with the invention, hereinafter described, a photosensitive device such as a vidicon is located above an irradiant or illuminated body as it travels along a conveyor and is utilized to scan the image of the surface of this body along a fixed line extending substantially perpendicular to the direction of movement of the body. Means are provided in conjunction with the vidicon for producing a group of voltage pulses each time its electron beam scans across the image of the surface of the body, the number of pulses in each group being proportional to width. The electron beam of the vidicon will scan across the image of the body many times each second; and, likewise, successive groups of pulses will be produced many times per second. In order to sample dimensional readings along the length of the body, it is necessary to eliminate all but a few of the groups. Accordingly, the scan cycles of the vidicon are counted; and after a predetermined number of cycles, a gate circuit is actuated to pass one of the groups of pulses produced by the vidicon. This process is repeated with one group of pulses being passed through the gate circuit for each of the said predetermined number of scan cycles so that sampling of dimensional readings is obtained along the length of the body.

In order to average the dimensional readings sampled in the manner described above, the output of the aforesaid gate circuit is fed to an averaging counter which may, for example, produce one output pulse in response to every ten input pulses. The output of this averaging counter is then fed to a read-out counter which indicates the width or other dimension in feet and inches. If the averaging counter divides by ten, then the read-out counter will be disabled after ten groups of pulses have passed through the gate circuit. In this manner, one-tenth of each sampled group of pulses is fed to the read-out counter, and after ten groups of sampled pulses have passed through the gate an indication of the average width or other dimension of the article will be obtained from the read-out counter.

The above and other objects and features of the invention will become apparent from the following detailed description taken in connection with the accompanying drawings which form a part of this specification and in which:

FIG. 1 is a block diagram of the overall system of the invention;

FIG. 2 is an illustration of wave forms appearing at various points in the circuit of FIG. 1; and FIG. 3 is a block diagram of one type of read-out counter which may be used in the circuit of FIG. 1.

Referring to FIG. 1, an irradiant or illuminated body 10 is illustrated as passing over a series of conveyor rolls 12. Above the body is a vidicon tube 14 adapted to scan over a single fixed line which extends substantially perpendicular to the direction of movement of the body 10. The electron beam of the vidicon 14 is actuated to sweep across the image of body 10 by means of a sweep generator 16 which produces a sawtooth output wave form. This wave form is also used to drive a pulse generator 18 which will produce a square wave output pulse each time the electron beam of the vidicon passes through one cycle. Thus, the output of pulse generator 18 will appear as wave form A in FIG. 2 where a square wave pulse is produced for each cycle of the vidicon 14. Wave form A is then passed to a differentiator 20 which produces a sharp spiked pulse of positive polarity when the input wave form A changes in a positive direction and a sharp spiked pulse of negative polarity when the input signal changes in a negative direction. The output of differentiator 20 thus appears as wave form B in FIG. 2. This wave form is fed to a clipper 22 which eliminates the negative spiked pulses whereby the output of the clipper appears as wave form C in FIG. 2 where only the positive spiked pulses remain. These positive spiked pulses are passed through the contacts 24 of relay 26, when closed, and the normally closed contacts 28 of relay 30 to a recycling preset counter circuit 32.

Reverting again to vidicon 14, its output wave form will include a pulse each time the electron beam sweeps across the width of body 10; and the width of this pulse is proportional to the width of the body being scanned. These pulses are then fed to a gate circuit 34 and used to gate the output of oscillator 36. Consequently, the output of gate circuit 34 will appear as wave form D in FIG. 2 which consists of a plurality of groups of oscillations with the number of oscillations in each group being proportional to the width of body 10. These oscillations are passed through clipper 38 where they are converted into pulses and thereafter fed to a gate circuit 40 through the normally open contacts 42 of relay 26 and the normally closed contacts 44 of relay 30.

As will be understood, various other arrangements may be employed to produce groups of pulses at the input to gate circuit 40 with the number of pulses in each group being proportional to width. For example, the photosensitive surface of the vidicon tube 14 may be scribed to produce alternate conducting and non-conducting strips extending perpendicular to the direction of movement of the vidicon electron beam. In this manner, the groups of pulses will be produced directly without the necessity for circuits 34—38.

Positioned directly below the vidicon tube 14 is a photoelectric cell 46 which has its anode connected to a source of positive voltage identified as B+ and its cathode connected through resistor 48 to ground. The cathode of cell 46 is also connected to the control grid 50 of an electron valve 52. This valve is included in the energizing circuit for relay 26 which includes resistor 54, the valve 52 and the closed contacts of push button switch 56. Normally, the voltage on grid 50 will be such that valve 52 will be cut off and relay 26 will remain deenergized. However, when the leading edge of the irradiant or illuminated body 10 passes beneath the vidicon 14, the photoelectric cell 46 will conduct to raise the voltage on grid 50, thereby energizing relay 26 and closing its normally open contacts 24, 42 and 58. As shown, the valve 52 is shunted by resistor 60 and the normally open contacts of push button switch 56. With this arrangement, the relay 26 may be manually energized by depressing the push button switch 56.

Referring again to the recycling preset counter 32, its output will appear as wave form E where a single pulse 62 is produced in response to a predetermined number of input pulses in wave form C. If the sweep frequency of the vidicon 14 is 15,750 cycles per second, then the counter 32 may be set to produce the pulse 62 in response to 15,750 cycles of the vidicon or 15,750 pulses in wave form C. In this manner, a pulse will be produced at the output of counter 32 once each second. The counter circuit 32 may comprise any of the well-known devices for counting a predetermined number of input pulses. Counters of this type usually comprise a series of cascaded bistable multivibrator or flip-flop circuits together with appropriate feedback loops in order to obtain the desired number of counts.

The output of counter 32 appearing as pulse 62 in wave form E is then fed to a one-shot multivibrator 64 which effectively lengthens the pulse 62 to produce pulse 66 in wave form F of FIG. 2. The width of pulse 66 is equal to or slightly larger than the width of a group of pulses at the output of clipper 38. Pulse 66 is used to gate the output of clipper 38 passing through contacts 44 and 42. Remembering that 15,750 groups of pulses are produced at the output of clipper 38 before a pulse 66 is produced in wave form F, every 15,750th group of pulses at the output of clipper 38 will pass through gate 40, and this occurs once every second. If the body 10 moves at the rate of two inches per second, then a sample of the width is obtained every two inches along the length of the body.

The output of gate circuit 40 comprising a group of pulses from clipper 38 is passed to an N-period averaging decade 68 which will produce an output pulse in response to every ten input pulses from the gate circuit 40. A decade of this sort may comprise four bistable multivibrators connected in cascade together with appropriate feed-back loops in order to obtain a count of ten. The circuit 68, therefore, divides each group of pulses passing through gate 40 by ten to produce wave form G in which the number of pulses in the group is one-tenth the number of pulses in the group in wave form D which passed through the gate. These pulses are then fed to read-out counter 70 which indicates the width of the body 10 in feet and inches.

Reverting again to recycling preset counter 32, its output is also fed to an N-count preset gate 72 which is essentially a decade counter similar to counter 68. This counter, however, counts the pulses 62 occurring in wave form E once each second. After ten seconds have passed and ten pulses in wave form E have been fed to N-count gate 72, it will actuate relay 30 to open the normally closed contacts 28 and 44.

It will be noted that a ground connection 74 is provided for each of the counters 72, 32, 68 and 70 through lead 76 and normally closed push button switch 78. This ground connection is provided for the control grid in one of the two electron valves in each of the bistable multivibrator circuits provided in the various counters. Thus, when contacts 58 of relay 26 close, one of the two grids of the various bistable multivibrators will be grounded whereby the counting circuits will be reset to their initial counting conditions. That is, if it is assumed that counter 32 has counted 12,000 pulses when contacts 58 close, it will be reset whereby it will have to count another 15,750 pulses to produce an output pulse. Similarly, if counter 68 has counted five pulses, it will have to count another ten pulses to produce an output pulse after the contacts 58 close. Consequently, by closing contacts 58, the circuit is conditioned whereby all of the counters must begin counting from zero.

One type of read-out counter (identified as the circuit 70 in FIG. 1) which may be used herein is shown in FIG. 3. It comprises a driver circuit 80 connected to the output of the N-period decade 68. This driver circuit is connected to a units decade counter 82, which, in turn, feeds its output to a tens decade counter 84. Units decade counter 82 will produce an output pulse which is fed to counter 84 after ten input pulses have been applied to driver circuit 80. When counter 84 counts one pulse at the output of counter 82, it will produce a pulse on lead 86. Similarly, when counter 82 counts six pulses from circuit 68, it will produce an output on lead 88. When these two outputs coincide in pulse gate circuit 90, they will actuate a reset circuit 92 which then resets the counters 82 and 84 to start counting from zero. Since counter 84 will produce an output on lead 86 after ten input pulses have been applied to the circuit, and since counter 82 will produce an output on lead 88 after six input pulses have been applied thereto, the pulse gate circuit will pass a signal to circuit 92 to reset the counters in response to 16 input pulses. The output pulses from circuit 90 are also fed to decade counter 94 which indicates whole inches.

Operation of the device is as follows: Assuming that the body 10 has not as yet passed beneath the vidicon 14 in its path of travel along conveyor 12, the photoelectric cell 46 will not conduct; and electron valve 52 will be cut off whereby relay 26 is deenergized and contacts 58, 42 and 24 are open. During this time, relay 30 will be deenergized while contacts 28 and 44 remain closed. When the leading edge of the body 10 passes beneath the vidicon 14, the photoelectric cell 46 will conduct and raise the voltage on grid 50 whereby valve 52 will conduct to energize relay 26 and close contacts 58, 42 and 24. Closure of contacts 58 resets each of the counters 72, 32, 68, and 70 whereby the circuit is prepared to begin counting from zero.

As the electron beam of the vidicon 14 scans across the body 10 many times each second, it will produce wave form C at the output of clipper 22 which is fed through contacts 24 and 28 to the recycling preset counter 32. Assuming that the sweep frequency is 15,750 cycles per second and that the circuit 32 is set to count 15,750 pulses, an output pulse will be produced by circuit 32 once each second. As was explained above, this pulse is fed through the one-shot multivibrator 64 which then opens gate 40 to allow the 15,750th group of pulses from clipper 38 to pass to the N-period averaging decade 68. This action will continue with the gate passing one group of pulses from clipper 38 once each second. If the body is moving at the rate of two inches per second as was mentioned above, then a sample of the width of the object will be obtained every two inches.

The N-period averaging decade 68 then divides the number of pulses in each group by ten. While the N-period averaging decade 68 is dividing each group of pulses from gate 40, the pulses from circuit 32 are also applied to the N-preset counter 72. This counter will energize relay 30 to open contacts 28 and 44 after ten groups of pulses in wave form G have passed to the N-period averaging decade 68. Thus, while the N-period averaging decade 68 divides ten groups of pulses by ten, the number of pulses fed to this circuit is multiplied by ten before the contacts 28 and 44 open to stop the counting action. Thus, one group of pulses passing through gate 40 may contain 50 pulses while the next group may contain 48, while still the next group may contain 53. Since each group is divided by ten and effectively multiplied by ten before the contacts 28 and 44 close, an average number of pulses for the ten selected groups will appear at the output of circuit 68.

This average number of pulses is fed through driver circuit 80 to the units decade counter 82 which will produce an output pulse to trigger circuit 84 in response to ten input pulses. When 16 input pulses are received, circuit 90 will feed a pulse to whole inches decade counter 94 while circuits 82 and 84 are reset to again count 16 input pulses. The distance of the vidicon 14 from the body 10 is adjusted empirically whereby 16 pulses will be fed to driver circuit 80 for every inch in width of the body 10. Thus, when counters 82 and 84 count to 16 and produce an output pulse from gate circuit 90, it will indicate an inch in width of the body 10. These pulses are fed to the whole inches decade counter 94 which then counts the inch increments. Each time an output pulse passes through circuit 90, circuit 94 will produce a visual indication of the number of inches. At the same time, the circuits 82 and 84 may be provided with visual means to indicate the number of 1/16 inch counted. In this manner, the width of the body in inches and 1/16 inch will be visually indicated, and this measurement will be an average of the measurements attained at spaced intervals along the length of body 10. The counters 82 and 84 may also be adjusted to count in 1/32 inch. In this latter case a pulse would be produced on lead 86 after circuit 84 counted three while a pulse would be produced on lead 88 after circuit 82 counted two. Similarly, the circuits may be adjusted to indicate any fractional inch increment desired.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In apparatus for measuring the edge-to-edge dimension of an article, means for producing a train of voltage pulses having a predetermined pulse recurrence frequency, means for producing groups of pulses in which the number of pulses in each group is proportional to the dimension being measured and the recurrence frequency of the groups of pulses is equal to the recurrence frequency of said train of pulses, means including a counting device for producing a gating pulse in response to a predetermined number of pulses in said train, means for gating said groups of pulses with said gating pulse, and a device for counting the pulses passing through said gating means.

2. In apparatus for measuring the edge-to-edge dimension of an article, means for producing a train of voltage pulses having a predetermined pulse recurrence frequency, means for producing groups of pulses in which the number of pulses in each group is proportional to the dimension being measured and the recurrence frequency of the groups of pulses is equal to the recurrence frequency of said train of pulses, a first counting device for producing an output voltage pulse in response to a predetermined number of pulses in said train of pulses, a monostable multivibrator for producing a gating pulse in response to said output pulse from the first counting device, means for gating said groups of pulses with said gating pulse, and a second device for counting the pulses passing through the gating means.

3. The combination claimed in claim 2 wherein the gating pulse has a width at least equal to the duration of a group of pulses in said groups of pulses.

4. In apparatus for measuring the edge-to-edge dimension of an article, means for producing a train of voltage pulses having a predetermined pulse recurrence frequency, means for producing groups of pulses in which the number of pulses in each group is proportional to the dimension being measured and the recurrence frequency of the groups of pulses is equal to the recurrence frequency of said train of pulses, a first counting device for producing an output voltage pulse in response to a predetermined number of pulses in said train of pulses, means for producing a gating pulse in response to an output pulse from the first counting device, means for gating said groups of pulses with said gating pulse, a second device for counting the pulses passing through said gating means, connections including normally closed switch means for applying said train of voltage pulses and said groups of pulses to the first counting device and the gating means respectively, a third counting device adapted to count said output pulses from the first counting means, and relay means actuable by said third counting device after it has counted a predetermined number of said output pulses for opening said normally closed switch means.

5. In apparatus for measuring the edge-to-edge dimension of an article, means for producing a train of voltage pulses having a predetermined pulse recurrence frequency, means for producing groups of pulses in which the number of pulses in each group is proportional to the dimension being measured and the recurrence frequency of the groups of pulses is equal to the recurrence frequency of said train of pulses, a first counting device for producing an output pulse in response to a predetermined number of pulses in said train of pulses, means responsive to each of said output pulses for producing a gating pulse, a gating device for gating said groups of pulses with said gating pulses, a second counting device responsive to the output of said gating device for producing an output pulse for every $n$th pulse in said groups of pulses passing through the gating device, means including a normally closed switch device for applying said train of pulses and said groups of pulses to said first counting device and said gating device respectively, means including a third counting device responsive to the output pulses from said first counting device for opening said normally closed switch device after $n$ output pulses from the first counting device have been applied thereto, and apparatus for counting the output pulses from said second counting device.

6. In apparatus for measuring the edge-to-edge dimension of an article, means for producing a train of voltage pulses having a predetermined pulse recurrence frequency, means for producing groups of pulses in which the number of pulses in each group is proportional to the dimension being measured and the recurrence frequency of the groups of pulses is equal to the recurrence frequency of said train of pulses, a counting device for producing an output pulse in response to a predetermined number of pulses in said train of pulses, means responsive to each of said output pulses for producing a gating pulse, a gating device for gating said groups of pulses with said gating pulses, a first decade counter responsive to the output of said gating device, a second decade counter responsive to the output pulses from said first-mentioned counter, means including relay-operated switch means for applying said groups of pulses and said train of pulses to the gating device and the first-mentioned counting device respectively, means for applying the output of said second decade counter to said relay-operated switch means whereby the switch means will open in response to an output pulse from said second decade counter, and apparatus for counting the output pulses from said first decade counter.

7. In apparatus for measuring the edge-to-edge dimension of an article, means for producing a train of voltage pulses having a predetermined pulse recurrence frequency, means for producing groups of pulses in which the number of pulses in each group is proportional to the dimension being measured and the recurrence frequency of the groups of pulses is equal to the recurrence frequency of said train of pulses, a first counting device, means including normally closed switch means for applying said train of pulses to said first counting device, means responsive to the output from said first counting device for producing a gating pulse, a gating device for gating said groups of pulses with said gating pulses, means including said normally closed switch means for applying said groups of pulses to said gating device, a second counting device responsive to the output of said first counting device, means responsive to an output pulse from said second counting device for opening said normally closed switch means, a third counting device responsive to pulses passing through said gating device, and a fourth counting device connected to the output of said third counting device.

8. The combination claimed in claim 7 wherein the number of pulses counted by the second and third counting devices is the same.

9. In apparatus for measuring the edge-to-edge dimension of an article which is moving in a direction perpendicular to the dimension which is to be measured, means including an electron-optics device for scanning an image of the surface of said article with an electron beam along said dimension to produce a group of pulses each time the electron-optics device scans with the number of pulses in each group being proportional to the length of said dimension, means for producing a train of voltage pulses having a pulse repetition frequency equal to the scan frequency of said electron beam, means including a counting device for producing a gating pulse in response to a predetermined number of pulses in said train of pulses, means for gating said groups of pulses with said gating pulse, a second counting device for counting the pulses passing through said gating means, and apparatus for resetting said counting devices when the leading edge of said moving article is initially scanned by said electron beam.

10. The combination claimed in claim 9 wherein the counting devices each comprise a plurality of cascaded bistable multivibrator units, and wherein the apparatus for resetting the counting devices comprises means positioned adjacent said electron-optics device for sensing the moving object while it is scanned by said electron beam, and relay means actuable by said sensing means when the article passes thereby for switching each multivibrator unit in the respective counting devices to one of its two stable states.

11. In apparatus for measuring the edge-to-edge dimension of an article which is moving in a direction perpendicular to the dimension which is to be measured, means including an electron-optics device for scanning an image of the surface of said article with an electron beam along said dimension to produce a group of pulses each time the electron-optics device scans with the number of pulses in each group being proportional to the length of said dimension, means for producing a train of voltage pulses having a pulse repetition frequency equal to the scanned frequency of said electron beam, a first counting device for producing an output pulse in response to a predetermined number of pulses in said train of pulses, means responsive to each of said output pulses for producing a gating pulse, a gating device for gating said groups of pulses with said gating pulses, a second counting device for counting the pulses passing through said gating means, a third counting device for counting the output pulses from said first counting device, circuit means including relay-operated switch means for applying said groups of pulses and said train of pulses to a gating device and said first counting device respectively, means for applying the output of said third counter to said relay-operated switch means whereby the switch means will open in response to an output pulse from said third counting device, and means for resetting each of said counting devices when the leading edge of said moving article is initially scanned by said electron beam.

References Cited in the file of this patent

UNITED STATES PATENTS

| | | |
|---|---|---|
| 2,494,441 | Hillier | Jan. 10, 1950 |
| 2,674,915 | Anderson | Apr. 13, 1954 |
| 2,756,627 | Boycks | July 31, 1956 |
| 2,907,519 | Covely | Oct. 6, 1959 |